United States Patent [19]
Hamberg et al.

[11] Patent Number: 5,150,886
[45] Date of Patent: Sep. 29, 1992

[54] TOP MOUNT ASSEMBLY FOR A SUSPENSION ACTUATOR

[75] Inventors: James P. Hamberg, Beavercreek; Todd H. Baldini, Dayton; Stanley E. Smith, Dayton; Wendell Collins, Jr., Dayton; Richard E. Longhouse, Dayton, all of Ohio

[73] Assignee: General Motors Corporation, Detroit, Mich.

[21] Appl. No.: 751,925

[22] Filed: Sep. 3, 1991

[51] Int. Cl.$^5$ .............................................. F16F 3/10
[52] U.S. Cl. .................. 267/220; 267/140.4; 267/152; 267/227
[58] Field of Search ............ 267/220, 227, 152, 30, 267/259, 161, 162, 140.4

[56] References Cited

U.S. PATENT DOCUMENTS

| | | | |
|---|---|---|---|
| 3,365,189 | 1/1968 | Carlson | 267/152 |
| 4,909,642 | 3/1990 | Hoermandinger | 267/220 X |
| 4,968,010 | 11/1990 | Odobasic | 267/162 |
| 4,971,296 | 11/1990 | Kondo | 267/220 |
| 4,984,777 | 1/1991 | Kurr et al. | 267/162 X |

FOREIGN PATENT DOCUMENTS

| | | | |
|---|---|---|---|
| 525165 | 5/1986 | Canada | 267/140.4 |
| 336775 | 10/1989 | European Pat. Off. | 267/220 |
| 246525 | 10/1988 | Japan | 267/220 |
| 1146496 | 3/1985 | U.S.S.R. | 267/140.4 |

OTHER PUBLICATIONS

Steven Basic, Omega Components, Erie, Pa., 18-page, undated article describing and illustrating an "integrated spring damper".

Steven Basic, Design News, two-page, undated article titled, "Embedded Washers Absorb Shock, Vibration", describing and illustrating an integrated spring damper, Mar. 25, 1991.

Primary Examiner—George E. A. Halvosa
Attorney, Agent, or Firm—A. Michael Tucker

[57] ABSTRACT

A top mount assembly includes a resilient isolator designed to be seated on an upper end of an actuator. A guiding sleeve is seated on the isolator and includes an upstanding annular wall forming a cavity in an upper surface of the guiding sleeve. At least one Belleville spring is mounted in the cavity to permit deflection of the assembly during the operational range of the actuator. A thrust plate is mounted on the Belleville spring and attached to the body.

12 Claims, 2 Drawing Sheets

TOP MOUNT ASSEMBLY FOR A SUSPENSION ACTUATOR

BACKGROUND OF THE INVENTION

1. Field of the Invention

The present invention relates generally to mounting assemblies for hydraulic actuators and dampers used in vehicular suspension systems. In particular, the present invention is concerned with at least one Belleville spring incorporated in a top mount assembly to reduce ride harshness and vibration transmission from an actuator or a damper.

2. Description of the Related Art

Conventional top mount assemblies include at least one resilient element (usually formed from rubber) to isolate and reduce transmission of road inputs to a vehicular body from an actuator. A top mount must be firm enough to support and maintain the weight of the vehicle and simultaneously be resilient enough to isolate road inputs. To reduce impact harshness, it is desirable to permit the deflection of a top mount during an operational range of the actuator, thereby reducing vibrations transferred to the body. When high loads are incurred, the top mount preferably resists deflection.

A single path top mount utilizes a single pad of rubber to accommodate the forces generated by an actuator or a damper and a cooperating coil spring. A dual rate top mount includes a single rubber pad having different spring rates for the coil spring and the actuator. A dual path strut mount has two separate rubber pads, one to carry forces generated by the coil spring and one to receive forces from the actuator. The dual rate and dual path top mounts offer improvements over a single path top mount which provides a compromised spring rate to accommodate the two different forces These types of conventional top mounts produce substantially linear load deflection curves.

In certain applications, particularly those where an actuator provides both the supporting force and the reactive force in a suspension system, only a single path top mount is used. Such an application includes active vehicular suspension systems wherein hydraulic actuators (usually one at each wheel assembly) provide controllable compression and rebound forces between a sprung body and an unsprung wheel assembly in response to a control signal in real time to produce a desired suspension behavior. Such actuators may include a cylindrical, outer reservoir tube containing hydraulic fluid and a reciprocating element. Pressurized fluid from an external source such as an accumulator is received from and delivered to an actuator to resist compression and perform rebound. The pressurized actuators provide the supporting force for the body without the use of conventional mechanical springs. An electronic controller may receive various inputs, including vehicle speed, a braking signal and a steer angle signal to determine the desired suspension mode.

SUMMARY OF THE INVENTION

The present invention includes a top mount assembly for securing an upper end of a hydraulic actuator of a vehicular suspension system to a body. The top mount assembly includes at least one Belleville spring mounted in series with a single path isolator to permit deflection of the assembly during the operational range of the actuator. The assembly achieves an S-shaped load deflection curve as opposed to a substantially linear curve for conventional top mount assemblies. When the assembly operates in the "flat" portion of the S-shaped curve, vibration transmissions and ride harshness are reduced.

A top mount assembly includes a resilient isolator designed to be seated on an upper end of an actuator. A guiding sleeve is seated on the isolator and includes an upstanding annular wall forming a cavity in an upper surface of the guiding sleeve. At least one Belleville spring is mounted in the cavity to permit deflection of the assembly during the operational range of the actuator. A thrust plate is mounted on the Belleville spring and attached to the body.

DETAILED DESCRIPTION OF THE PREFERRED EMBODIMENTS

Figure 1:
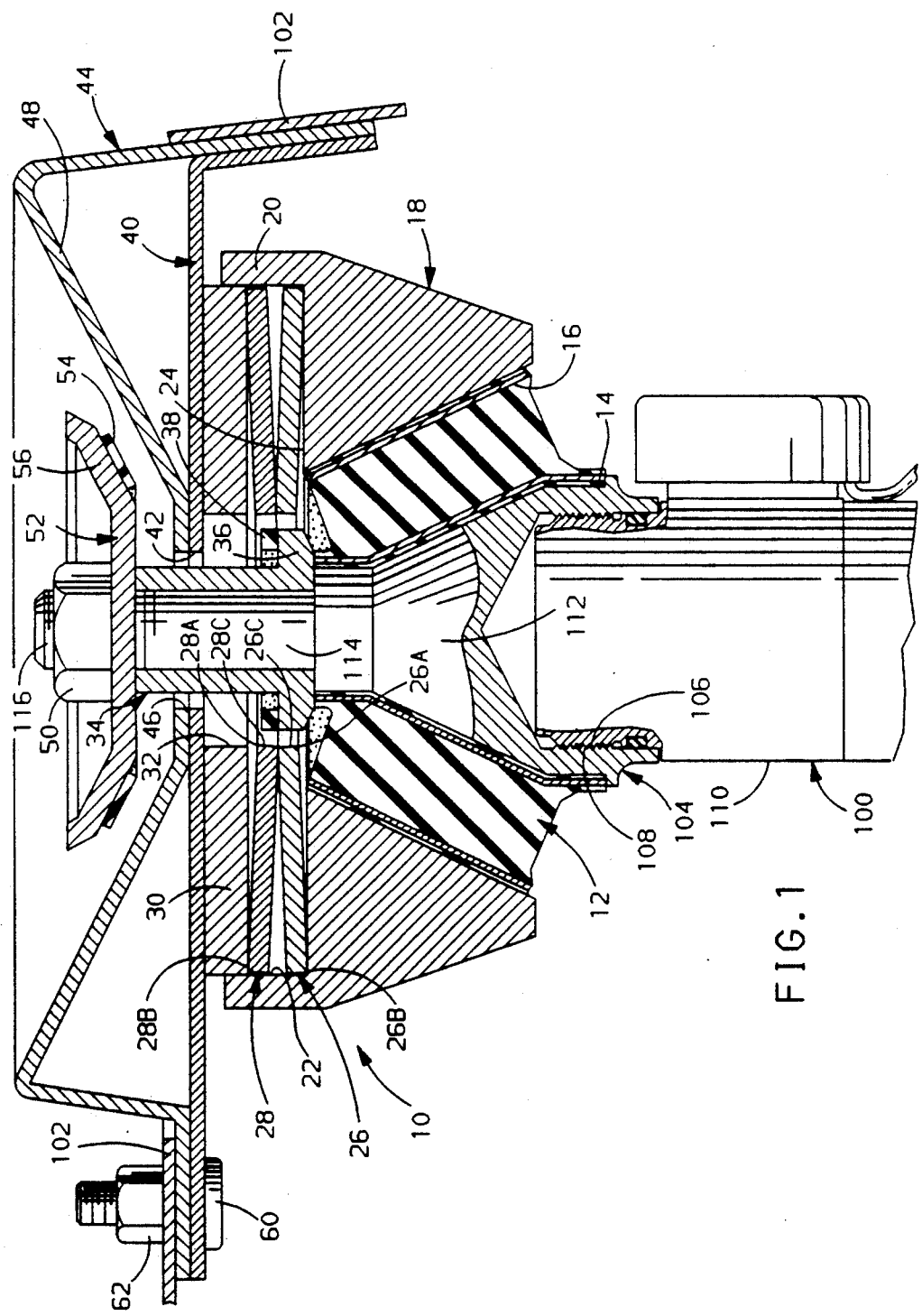
FIG. 1 is a sectional view of a preferred embodiment of the present top mount assembly used to attach an upper end of a partially illustrated hydraulic actuator to a vehicular body.

A top mount assembly indicated generally at 10 is illustrated in FIG. 1. The top mount assembly 10 attaches a hydraulic actuator 100 to a body 102 of a vehicle. The lower end of the actuator 100 (not illustrated) is attached to a wheel assembly in any desired manner.

A tenon 104 is secured to the upper end of the actuator 100. In the embodiment illustrated, the tenon 104 includes internal threads 106 which are mated to external threads 108 of a reservoir tube adapter 110 of the actuator 100. The tenon 104 also has a conical outer surface at its base portion 112 and an upstanding, reduced-diameter cylindrical neck 114 having external threads 116. The tenon 104 can provide an internal fluid passage (not illustrated) to a pressurized source of hydraulic fluid if desired. Other configurations of the tenon 104 and the actuator 100 are within the scope of this invention.

A resilient isolator 12 is formed as a conical element having a central opening and an inner surface complementary to the outer surface of the base portion 112 of the tenon 104. When assembled, the isolator 12 is fitted over the neck 114 of the tenon 104 and seated on the base portion 112. Preferably, the isolator 12 includes inner and outer sleeves 14 and 16 embedded in the resilient material for strength and shaping.

A guiding sleeve 18 includes a central opening and an inner surface complementary to and seated on an exterior surface of the isolator 12. The guiding sleeve 18 includes an annular upstanding wall 20 forming a recessed cavity 22 in an upper surface 24 of the guiding sleeve 18.

Figure 2:
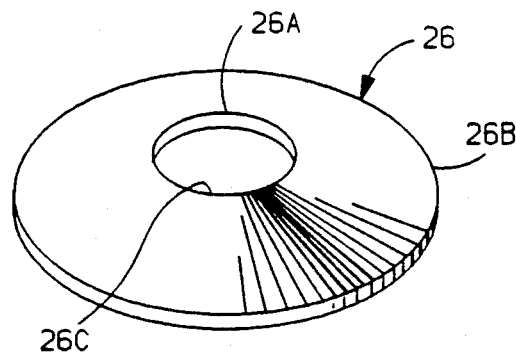
FIG. 2 is a perspective view of one of the Belleville springs used in the top mount assembly of FIG. 1.

In the embodiment illustrated in FIG. 1, a pair of Belleville springs 26, 28 are mounted in the cavity 22 of the guiding sleeve 18 over the neck 114 of the tenon 104. Each Belleville spring 26, 28 is a substantially dished element, as illustrated in the perspective view of FIG. 2 wherein Belleville spring 26 has been removed from the top mount assembly 10 for purposes of clarity of illustration. As described below, each spring 26, 28 acts as a springable annular disc. Each spring 26, 28 includes respective inner and outer peripheral edges 26A, 28A and 26B, 28B and respective central openings 26C, 28C. If desired, radial slots (not illustrated) can be formed from either the inner or outer peripheral edges 26A, 28A and 26b, 28B. In FIG. 1, the inner peripheral edges 26A, 28A of the Belleville springs 26, 28 are engaged, while the outer peripheral edges 26B, 28B are spaced apart, so that the springs 26, 28 are mounted in a first series pattern.

An annular load ring 30 having a central opening 32 is concentrically mounted over the neck 114 and placed in contact with the outer peripheral edge 28B of the upper Belleville spring 28.

A cylindrical spacer 34 is fitted over the neck 114 and within the respective central openings of the Belleville springs 26, 28 and the load ring 30. An outwardly-projecting flange 36 is formed at the lower portion of the spacer 34. Preferably, an annular cushioning pad 38 formed from a resilient material is mounted on an upper surface of the flange 36.

A thrust plate 40 having a central opening 42 is placed on the load ring 30. An adapter 44 having a central opening 46 and an angled annular wall 48 is placed on the thrust plate 40. When assembled, the neck 114 and the spacer 34 project upwardly through respective central openings in the Belleville springs 26, 28, the load ring 30, the thrust plate 40 and the adapter 44. The tenon 104 is retained by a nut 50 threaded to exterior threads 116 on the neck 114 and a retaining washer 52 mounted between the nut 50 and the spacer 34. Preferably, an annular cushioning pad 54 formed from a resilient material is mounted on a lower surface of an angled portion 56 of the retaining washer 52 to provide isolation against the angled wall 48 of the adapter 44. The thrust plate 40 and the adapter 44 are secured to the body 102 by a plurality of fasteners 60 and nuts 62 (of which only one complementary pair is illustrated in FIG. 1).

When the top mount assembly 10 is assembled on a vehicle, the load ring 30 transfers the weight of the vehicle to preload the Belleville springs 26, 28 and compress the isolator 12. The top mount assembly 10 reciprocates due to inputs from the wheel assembly and the operation of the actuator 100. As the actuator 100 is urged upwardly, the Belleville springs 26, 28 deflect upwardly. This deflection provides an additional degree of motion to reduce transmission of vibration to the body 102, thereby reducing ride harshness experienced in conventional top mount assemblies. When the upward force is removed, the Belleville springs 26, 28 return to their original positions.

The flange 36 and the retaining washer 52 function as travel limiters for the top mount assembly 10. During upward movement of the actuator 100, the flange 36 and pad 38 engage a lower surface of the thrust plate 40 to limit the range of travel. In a similar manner, the retaining washer 52 and pad 54 limit the downward travel of the actuator 100 as the angled portion 56 engages the complementary, angled wall 48 of the adapter 44.

Figure 3:
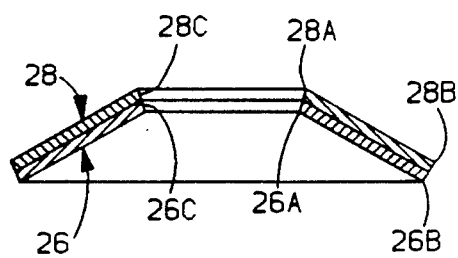
FIG. 3 is a sectional view through a pair of Belleville springs stacked in parallel.
Figure 4:
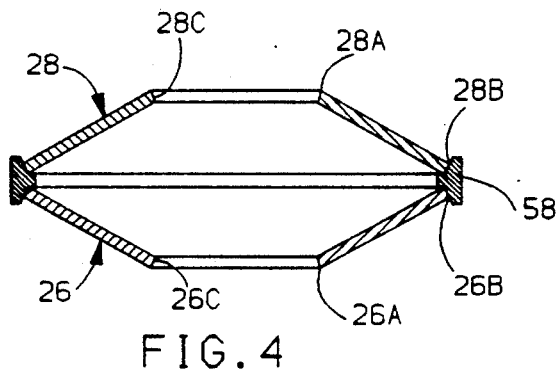
FIG. 4 is a sectional view through a pair of Belleville springs mounted in series on an annular spacer.

FIGS. 3 and 4 are representative of alternate patterns for combining the Belleville springs 26, 28 for use in the present top mount assembly 10. For example, in FIG. 3 the Belleville springs 26, 28 are mounted in parallel. In FIG. 4, an annular spacer 58 is inserted between the Belleville springs 26, 28 mounted in series with the outer peripheral edges 26B, 28B engaging the spacer 58. The spacer 58 increases the distance between the Belleville springs 26, 28 and, therefore, the amount of deflection. While two springs and three patterns have been shown, it is understood that other embodiments of the top mount assembly 10 may require only one Belleville spring or more than two Belleville springs, depending on space limitations and the desired load deflection characteristics. Also, various patterns for the Belleville springs can be envisioned.

Figure 5:
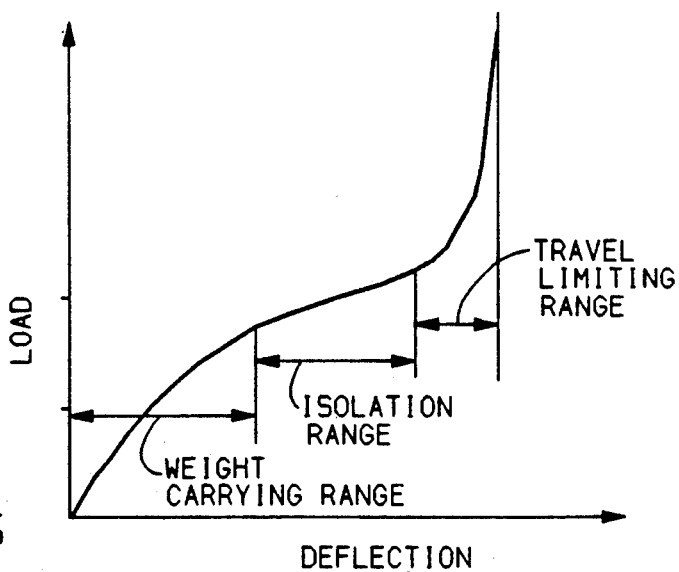
FIG. 5 is a graph illustrating a load deflection curve achieved by the present top mount assembly.

FIG. 5 is a graph illustrating a typical load deflection curve for the present mount assembly 10. When the top mount assembly 10 functions in the isolation range (i.e., the "flat" portion of the curve), the Belleville springs 26, 28 provide an extra range of deflection not present in conventional single path top mounts. The extra deflection reduces vibration transmissions to the body 102, thereby reducing ride harshness.

Although the present invention has been described with reference to preferred embodiments, workers skilled in the art will recognize that changes may be made in form and detail without departing from the spirit and scope of the invention.

The embodiment of the invention in which an exclusive property or privilege is claimed are defined as follows:

1. A vehicular suspension system comprising:
   (A) a hydraulic actuator for supporting a vehicular body; and
   (B) a top mount assembly attaching the actuator to the body, the mounting assembly including
      (a) a resilient isolator seated on the actuator;
      (b) a guiding sleeve seated on the simulator having a recessed cavity;
      (c) Belleville spring means received within the cavity;
      (d) thrust plate means seated on an uppermost surface of the Belleville spring means;
      (e) means for securing the actuator to the thrust plate means; and
      (f) means for securing the thrust plate means to the vehicular body.

2. The vehicular suspension system specified in claim 1 wherein the thrust plate means includes a load ring seated on the Belleville spring means.

3. The vehicular suspension system specified in claim 1 wherein the thrust plate means includes an adapter having an angled, annular wall.

4. The vehicular suspension system specified in claim 3 wherein the means for securing the thrust plate means includes a retaining washer having an angled portion complementary to the adapter angled wall to limit the range of travel of the actuator.

5. The vehicular suspension system specified in claim 1 including spacer means received within the cavity and engageable with the thrust plate means to limit the range of travel of the actuator.

6. The vehicular suspension system specified in claim 1 wherein the Belleville spring means includes a plurality of springable annular discs.

7. A vehicular suspension system comprising:
   (a) a hydraulic actuator for supporting a sprung vehicular body and an unsprung wheel assembly;
   (b) a resilient isolator seated on an exterior surface of an upper end of the actuator;
   (c) a guiding sleeve seated on an exterior surface of the isolator;

(d) a recessed cavity formed in an upper surface of the guiding sleeve;

(e) Belleville spring means mounted in the cavity for defection as the actuator reciprocates from road inputs;

(f) thrust plate means cooperating with the Belleville spring means;

(g) means for securing the actuator to the thrust plate means; and (h) means for securing the thrust plate means to the body.

8. The vehicular suspension system specified in claim 7 wherein the Belleville spring means includes a plurality of springable annular discs.

9. The vehicular suspension system specified in claim 7 wherein the thrust plate means includes a load ring seated on the Belleville spring means.

10. The vehicular suspension system specified in claim 7 wherein the thrust plate means includes an adapter having an angled, annular wall.

11. The vehicular suspension system specified in claim 10 wherein the means for securing the thrust plate means includes a retaining washer having an angled portion complementary to the adapter angled wall to limit the range of travel of the actuator.

12. The vehicular suspension system specified in claim 6 including spacer means received within the cavity and engageable with the thrust plate means to limit the range of travel of the actuator.

* * * * *